United States Patent [19]

Wagner

[11] Patent Number: 4,530,132
[45] Date of Patent: Jul. 23, 1985

[54] MEAT LOAF FORMING APPARATUS

[75] Inventor: Richard C. Wagner, Frankfort, Ill.

[73] Assignee: Hollymatic Corporation, Countryside, Ill.

[21] Appl. No.: 357,134

[22] Filed: Mar. 11, 1982

[51] Int. Cl.³ .............................................. A22C 7/00
[52] U.S. Cl. ......................................... 17/45; 17/32
[58] Field of Search ................ 17/32, 45; 83/110, 26, 83/27, 360, 369, 370, 372, 628, 616, 613

[56] References Cited

U.S. PATENT DOCUMENTS

| 813,375 | 2/1906 | Glauser. | |
|---|---|---|---|
| 1,231,279 | 6/1917 | Mason | 83/628 X |
| 2,694,222 | 11/1954 | Spang | 17/32 |
| 2,795,816 | 6/1957 | Spang et al. | 17/32 |
| 3,011,375 | 12/1961 | Müller | 83/372 X |
| 3,298,057 | 1/1967 | Liebmann, Jr. | 17/32 |
| 3,668,821 | 6/1972 | Benson et al. | 53/123 |
| 3,722,034 | 3/1973 | Baccetti | 17/32 |
| 4,280,618 | 7/1981 | Jensen | 17/32 X |
| 4,283,812 | 8/1981 | Corominas | 17/32 |
| 4,293,979 | 10/1981 | Colosimo et al. | 17/32 |
| 4,299,150 | 11/1981 | Huston et al. | 83/110 |

FOREIGN PATENT DOCUMENTS 608306 7/1926 France ................................ 83/628

OTHER PUBLICATIONS

Form F-7537, "Rev. 7-74" of Hobart Corporation.
Form F-7628, "Rev 5-76"]of Hobart Corporation.

Primary Examiner—Willie G. Abercrombie
Attorney, Agent, or Firm—Wood, Dalton, Phillips, Mason & Rowe

[57] ABSTRACT

A meat loaf forming apparatus and method in which ground meat is extruded through a shaping die of a desired cross-sectional shape onto a sheet of paper in contact with a rotating conveyor. A feeler operates a cut-off knife to sever the advancing meat and paper into preselected lengths, thereby forming successive loaves of meat.

8 Claims, 14 Drawing Figures

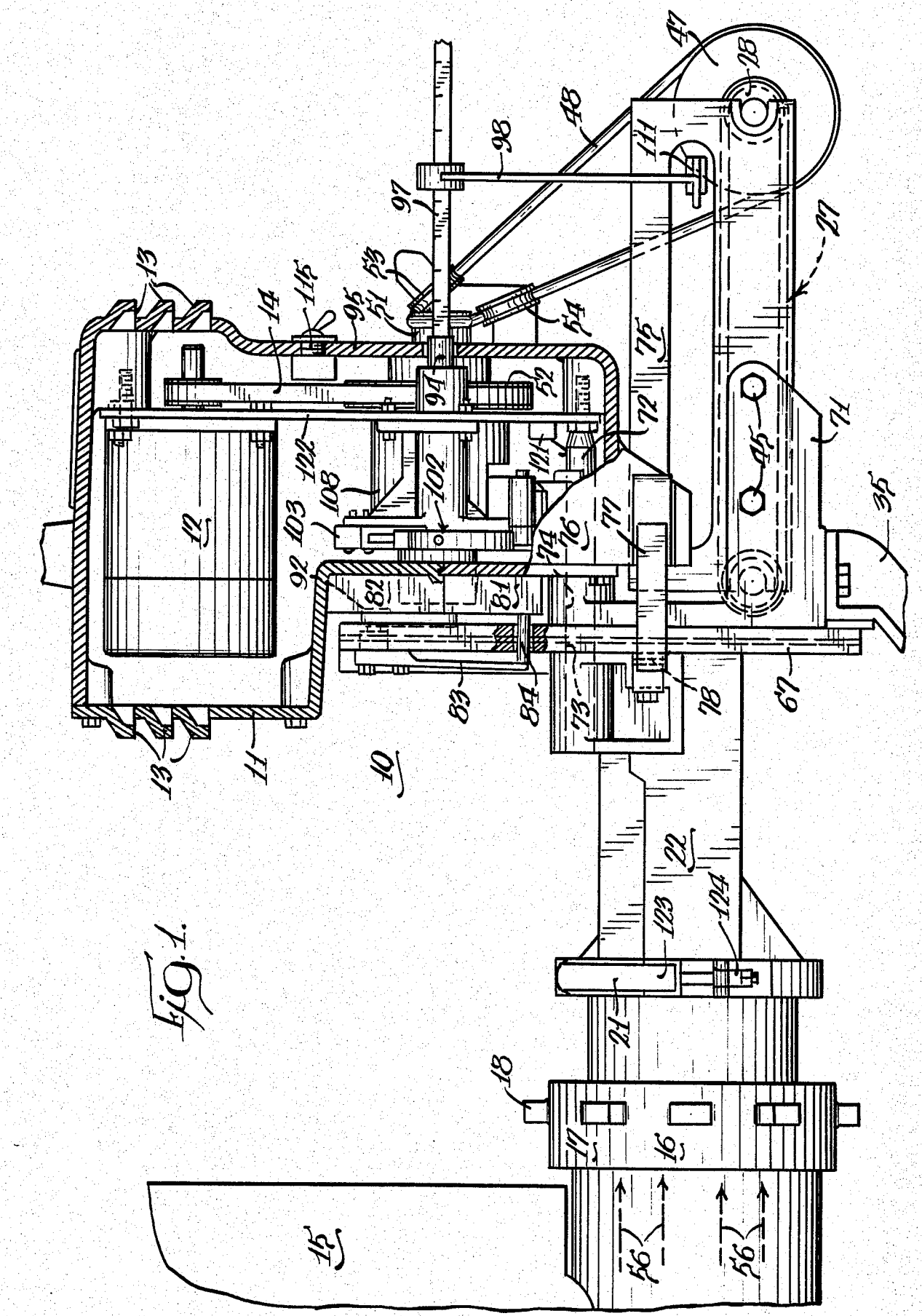

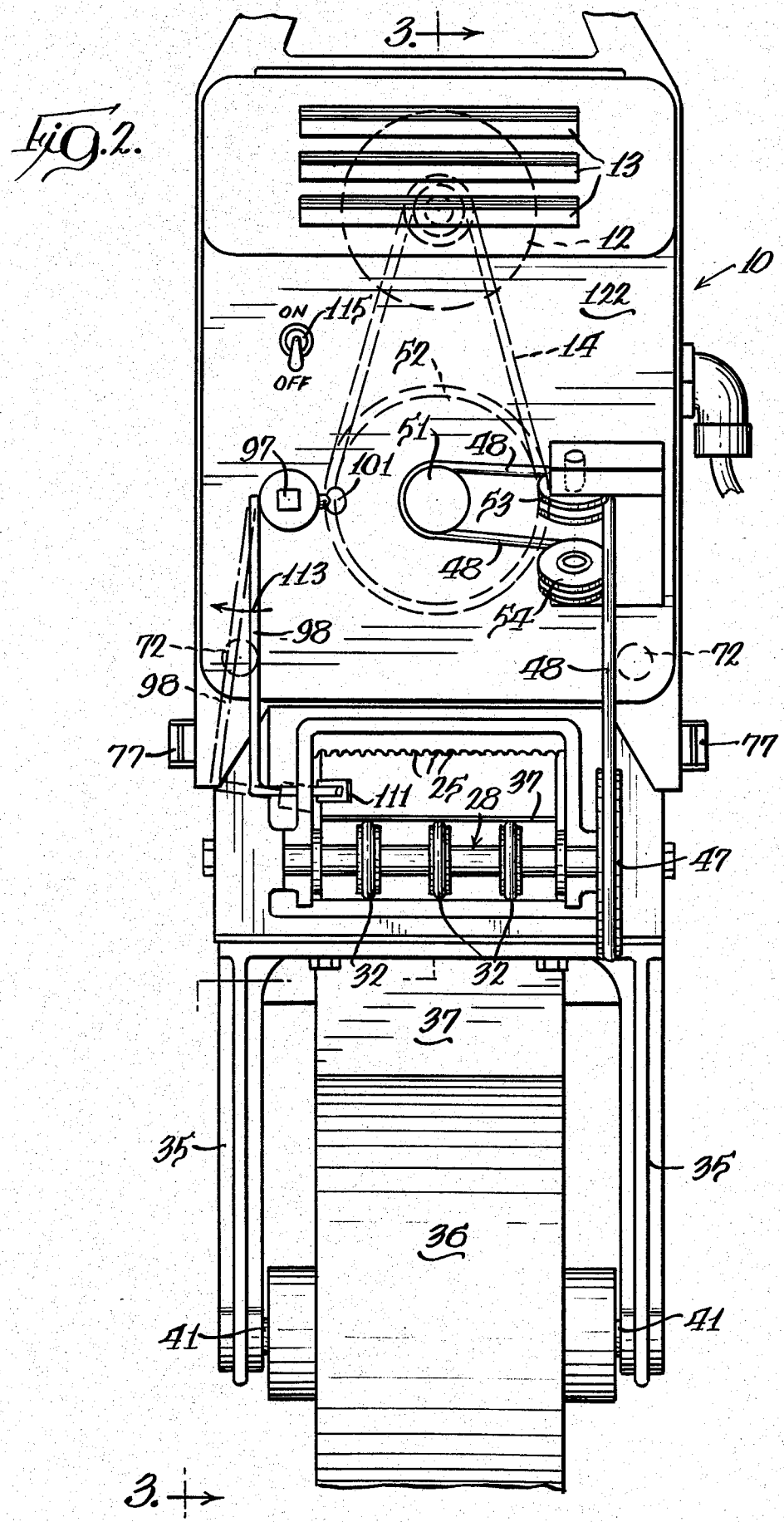

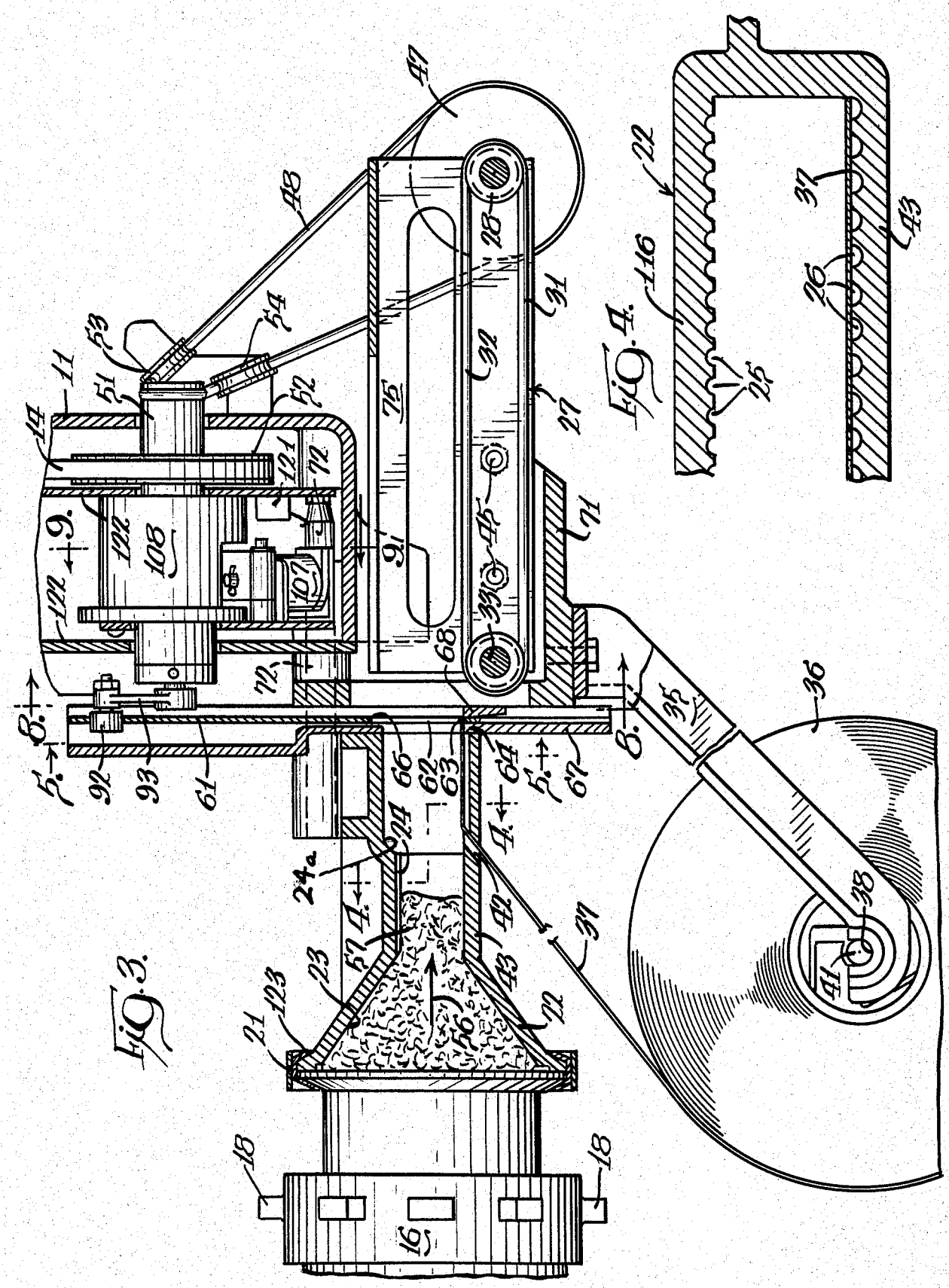

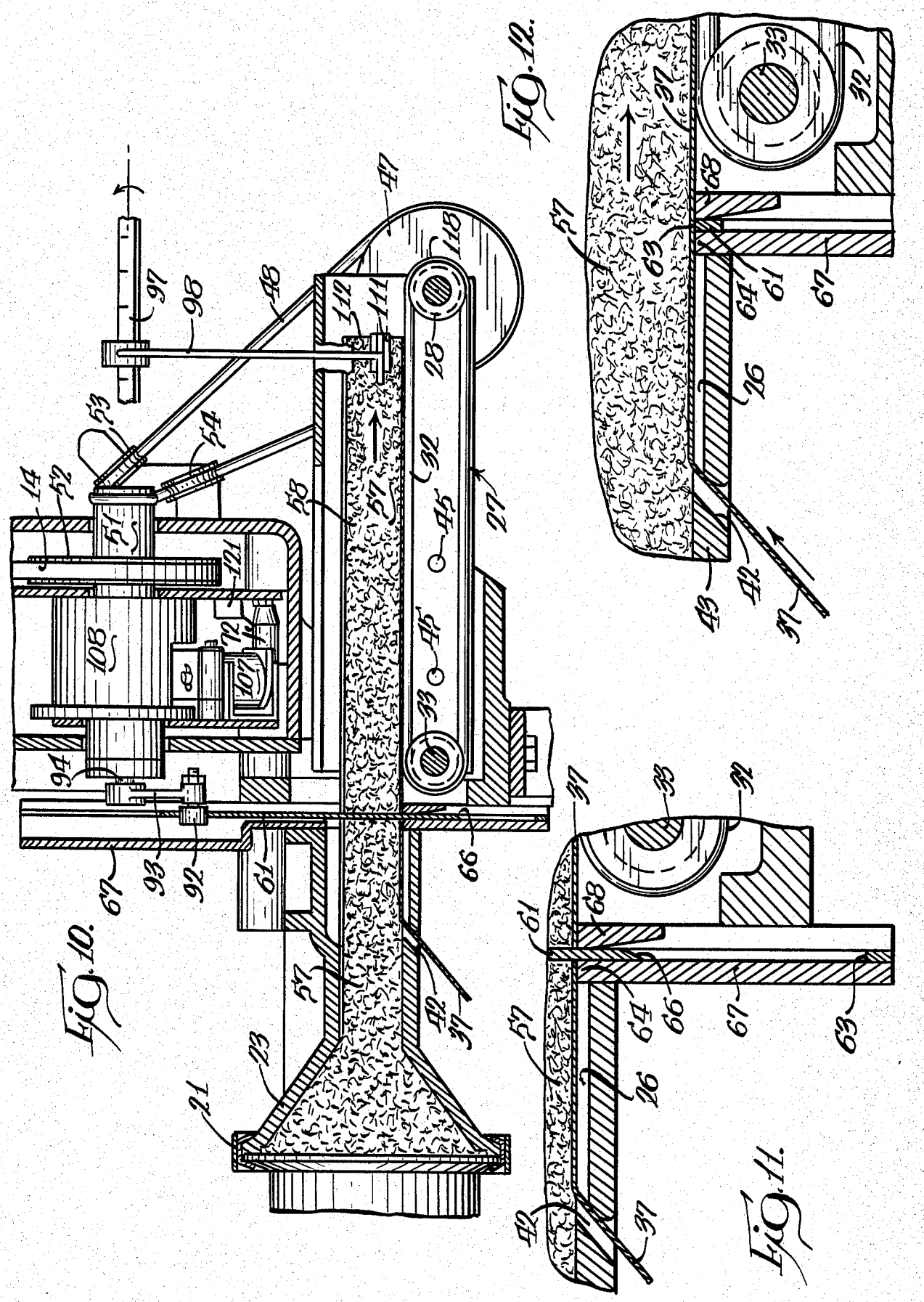

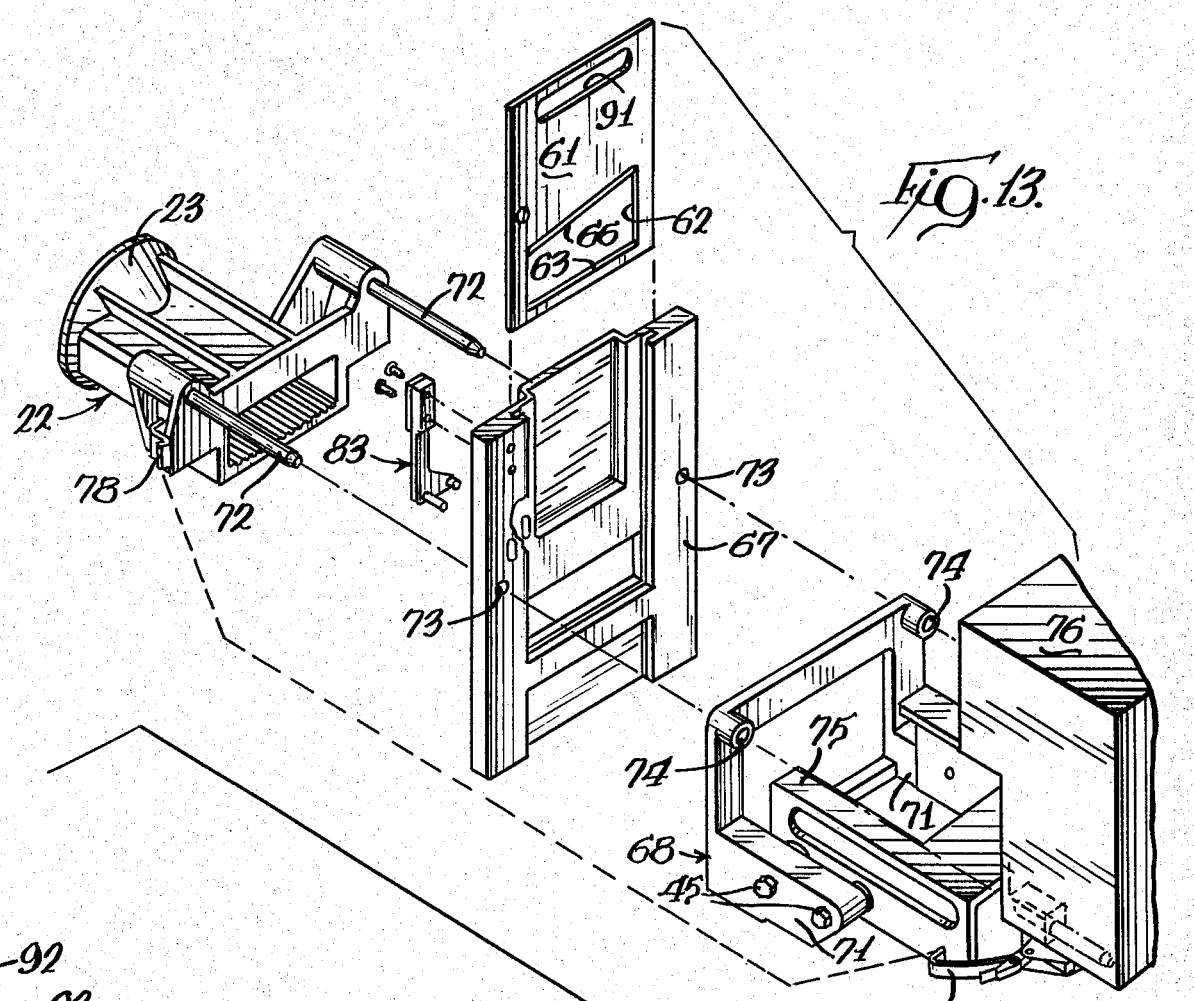
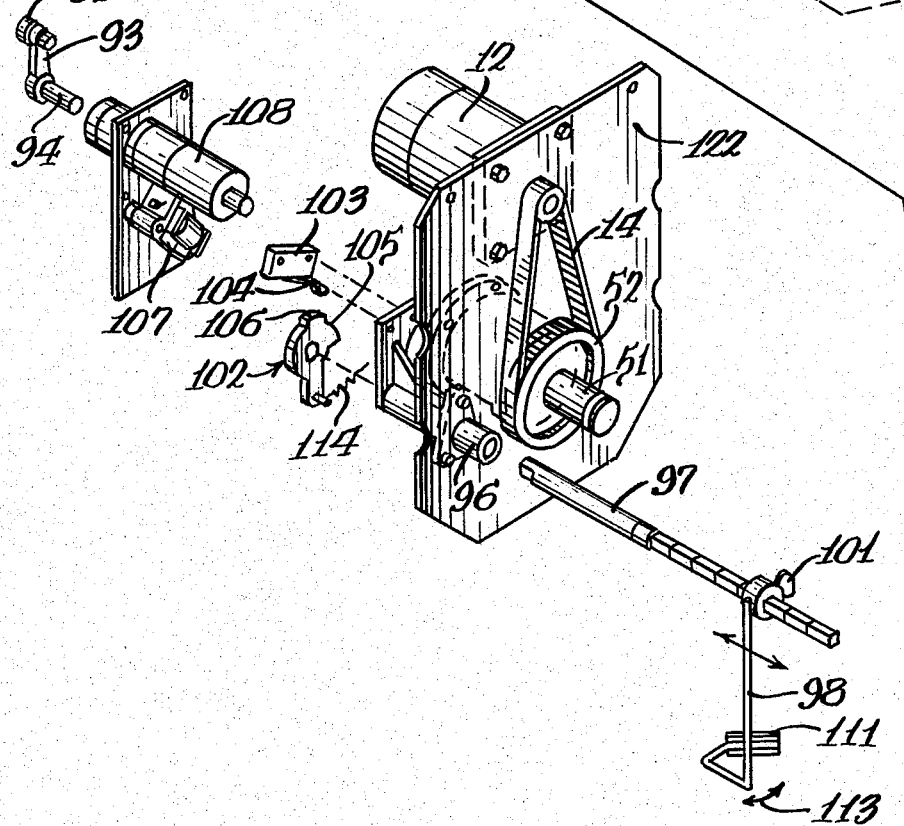

MEAT LOAF FORMING APPARATUS

BACKGROUND OF THE INVENTION

There is a demand in meat markets and other purveyors of meat which includes fish, poultry and even non-meat food products that are presented in the form of blocks or loaves of meat from about two ounces or less for patties to one pound or more for blocks or loaves.

This invention provides an automatically operated apparatus wherein successive loaves of predetermined size, weight and shape are produced automatically without substantial variation in size and weight and with each loaf resting on a piece of separator paper which permits displaying the loaves either in stacks of two or more or as single loaves.

SUMMARY OF THE INVENTION

The apparatus of this invention comprises an extruder having a die of a desired shape such as rectangular cross-section through which the meat is forced and onto a sheet of paper on a driven conveyor. The extruded meat and the paper sheet on which it is positioned are moved along by the conveyor until a trip mechanism is contacted which operates a guillotine-type knife that is forced through the extruded meat in a transverse direction to sever it into successive parts of predetermined size and weight. In a preferred apparatus, the paper or other separator sheet material is drawn from a roll.

The size of loaves, the cross-sectional shape of the loaves and the weight are all easily adjusted by selecting the proper die to determine the cross-sectional dimensions of each loaf and presetting the feeler that is contacted by the advancing forward end of the meat so as to determine the length of each loaf.

BRIEF DESCRIPTION OF THE DRAWINGS

FIG. 1 is a side elevational view of an apparatus embodying the invention with parts broken away for clarity of illustration;

FIG. 2 is a front elevational view of the apparatus of FIG. 1 taken from the right-hand end thereof;

FIG. 3 is a vertical sectional view taken substantially along line 3—3 of FIG. 2;

FIG. 4 is a fragmentary sectional view taken substantially along line 4—4 of FIG. 3;

FIG. 10 is a view similar to a portion of FIG. 3 and illustrating the position of the parts immediately after the blade has been forced down to a meat and paper severing position;

FIG. 11 is an enlarged fragmentary sectional view through a portion of FIG. 10 with the blade in lowered position as in FIG. 10;

FIG. 12 is a view similar to FIG. 11 but with the blade in raised position;

FIG. 13 is an exploded view of the assembly of the center part of the apparatus; and FIG. 14 is a similar exploded view of another essential part of the apparatus.

BRIEF DESCRIPTION OF THE PREFERRED EMBODIMENT

Figure 5:
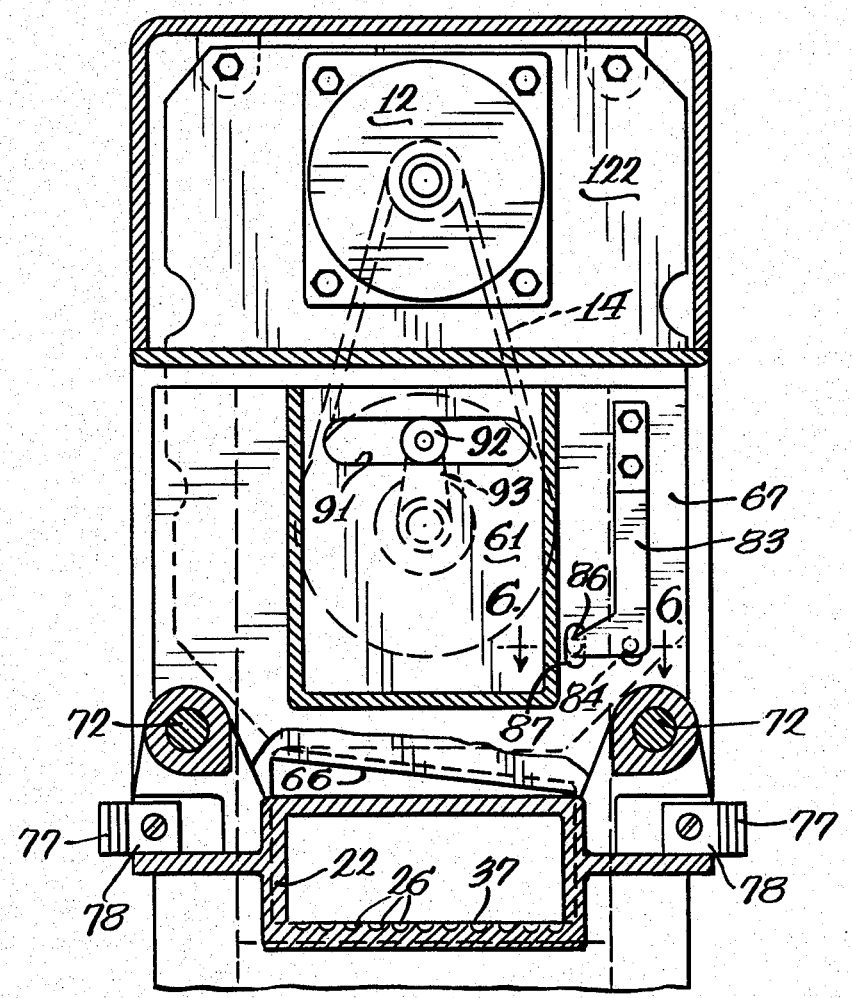
FIG. 5 is a vertical sectional view taken substantially along line 5—5 of FIG. 3.

In the meat or similar product loaf forming apparatus illustrated in the accompanying drawings, there is shown a continuous loaf forming and automatically controlled apparatus 10 including a housing 11 containing at the top thereof an electric motor 12 with the housing having oppositely located louver-covered openings 13 for ventilation of the motor. This single motor 12 drives a main drive belt 14 which energizes parts of the apparatus.

Positioned to one side of the apparatus 10 is a hopper 15 for retaining chunks of meat such as beef and a grinder 16 of conventional construction and thus is not illustrated in detail. Forming a part of the grinder apparatus 16 is a rotatable collar 17 provided with spaced radial lugs 18 for aid in hand rotating the collar 17 and assembling and disassembling the parts of the grinder. A typical hopper and grinder apparatus is described in U.S. Pat. No. 3,623,188 assigned to the same assignee as the present application.

Coaxially attached to the grinder 16 by releasable clamp 21 is a separate die 22 that has a tapered forward section 23 leading to a rear shaping section 24. This shaping section as is illustrated in detail in FIG. 4 has a rectangular cross-section, the top and bottom of which are provided with spaced parallel grooves 25 and 26.

Located rearwardly of the shaping die section 24 is a belt conveyor 27 comprising a driven roller 28 at the forward end of the belt 31, with a horizontal reach 32 and an idler roller 33 spaced from roller 28. The horizontal reach 32 is aligned with the bottom 34 of the extruded meat as shown in FIG. 10.

Mounted on a pair of parallel brackets 35 at the bottom of the apparatus is a roll 36 of a sheet 37 of meat-impervious separator material such as paper. Each of the side brackets 35 provided at its lower end with an upward opening substantially semi-circular groove 38 in which an end 41 of a roll supporting spindle is retained by gravity. The continuous sheet 37 extends through a forwardly inclined slot 42 in the bottom 43 of the tapered die 22 or extruder horn. The shaping section 24 increases in cross-sectional area at a curve 24a in the top wall thereof opposite the slot 42 whereby the pressure within the meat is reduced and meat does not extrude through the slot 42.

The driven roller 28 is driven by a coaxial pulley 47 which itself is driven by a drive belt 48. This drive belt 48 is driven from a pulley 51 which itself is driven by a larger pulley 52 engaged and driven by the motor main drive belt 14. Bolts 45 are provided connecting the conveyor frame 75 and shear frame arms 71.

The drive or operating belt 48 engages a pair of closely spaced smaller pulleys 53 and 54 and encircles the front coaxial pulley 47 which drives the front roller 28.

Also supporting the paper 37 at the rear is the rear or idler pulley 33 that is engaged by the belt conveyor 27.

With this arrangement, as the meat is forced from the grinder 16 as indicated by the arrows 56 and through the shaping die 22 in a forward moving rectangular block 57, the block or horizontal mass of meat adhesively engages the separator paper 37 and pulls it forwardly onto the conveyor 27. The conveyor 27 moves faster, e.g. 25% faster, than the extruded meat 57 so that the belt 32 "slides" relative to the meat and sheet 37. This serves to separate the successive loaves 58 of meat as they and the corresponding sheet are severed by a vertically movable guillotine knife structure 61.

The knife which is shown in elevated position in FIG. 3 and in lowered severing position in FIG. 10, is provided with a blade opening 62 of slightly larger cross-sectional size than the block of meat 57 so that the meat 57 and the continuous paper sheet 37 can extend through this opening 62 while the block of meat 57 is being extruded.

The bottom 63 of the opening 62 extends transversely across the path 56 of travel of the block of meat 57 and bridges the space between the front 64 of the rear of the shaping section 24 of the die 22 and the adjacent section 65 of the conveyor frame 65. This bridging prevents the meat and paper being accidentally extruded downwardly through the space 63.

The blade opening 62 is provided at its top with a slanted severing knife portion 66. This knife portion 66 forms the top of the blade opening 62 while the bottom 63 of this opening comprises a horizontal edge that bridges the space between the blade guide 67 and the shear frame 68. As is shown in perspective in FIG. 13, this shear frame 68 has two parallel projecting arms 71.

Also as shown in perspective in FIG. 13, the block of meat 57 forming die 22 is provided with a pair of spaced forwardly projecting rods 72 on which the blade guide 67 and the shear frame 68 is mounted. These rods 72 engage openings 73 in the blade guide 67 and openings 74 in the shear frame 68. Immediately forward of the shear frame 68 and between the arms 71 is the conveyor frame 75 for the belt conveyor 27. An enclosing cover 76 encloses the assembly of FIG. 13 and is provided with a toggle latch on either side, each adapted to engage a catch or keeper 78 for holding the parts assembled. A keeper 78 is illustrated in side elevation in FIG. 1 and in perspective in FIG. 13.

Figure 6:
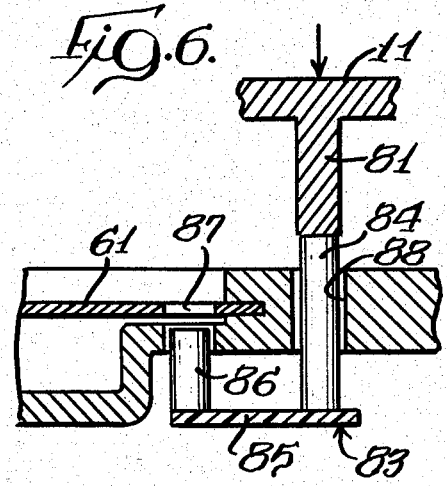
FIG. 6 is a fragmentary horizontal sectional view taken substantially along line 6—6 of FIG. 5.
Figure 7:
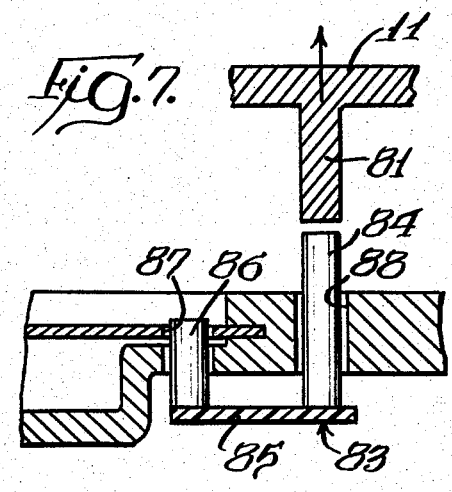
FIG. 7 is a view similar to FIG. 6 but illustrates the parts in a raised or blade-locking safety position.
Figure 8:
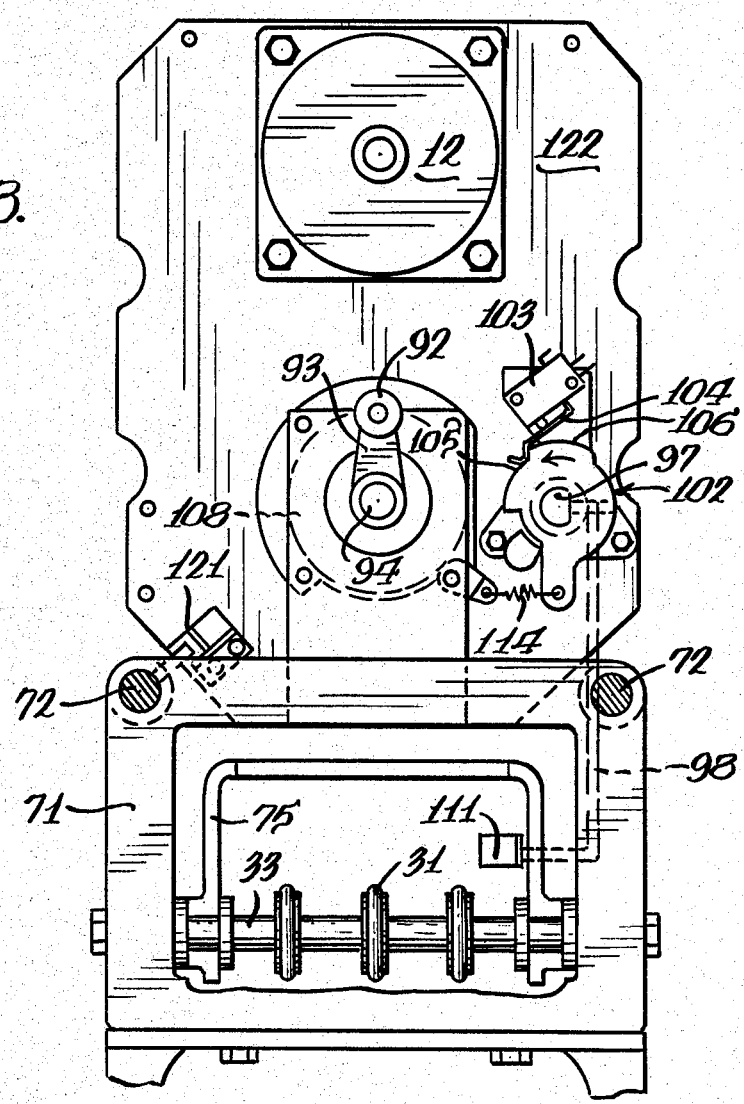
FIG. 8 is a vertical sectional view taken substantially along line 8—8 of FIG. 3.
Figure 9:
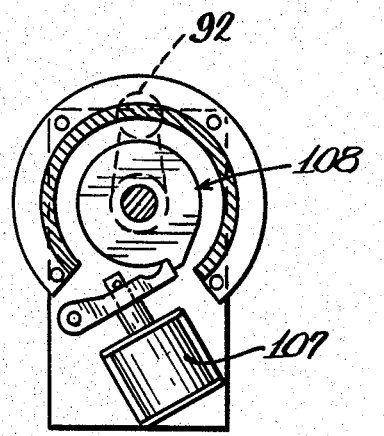
FIG. 9 is a fragmentary vertical section along line 9—9 of FIG. 3.

The housing 11 is provided with a pair of ribs 81 and 82 for spacing and strengthening purposes with the rib 81 operating a blade lock 83 as illustrated in FIGS. 6 and 7. As shown in FIG. 6, when the housing 11 and blade guide 67 are latched together by the side latches 77, the rib 83 depresses an operating pin 84 on the lock 83 against the urging of a flexible mount 85 thereby moving a locking pin 86 out of engagement with an opening 87 in the knife blade 61. Thus, as shown in FIG. 6, when the parts are kept together, the locking pin 86 is held out of engagement with the knife 61 opening 87. However, when the latches 78 are released and the parts are disassembled, the flexible strip mounting moves the blade lock 83 to the position shown in FIG. 7 where the locking pin 86 projects further into its opening 88 in the blade guide 67 and the locking pin 86 is projected into the opening in the blade 61 to lock the blade against movement and thereby aid in the assembly of roller 92 into drive slot 91 in the blade 61.

The roller 92 is located on the outer end of a crank arm 93. This crank arm or cam is mounted on the end of the shaft 94 that is driven by the timing belt 14 that in turn is driven by the motor 12.

Extending through a front wall 95 of the housing 11 is a bushing 96 that rotatably retains a switch operating rod 97. A projecting end of this rod 97 releasably retains one end of a sensor rod 98 which is adjustable into position by releasing a locking screw 101. The inner end of this rod 97 inwardly of the bushing 96 engages a size sensor cam 102 that operates a switch 103 that has a spring urged feeler 104. This feeler is adapted to engage the periphery 105 of the sensor cam 102 in depressed or retracted position by a raised portion 106 on the cam 102.

This cam 102 and switch 103 are located adjacent to a solenoid 107 which when energized operates a one-revolution clutch 108 on which the blade operating crank arm 93 is mounted for rotation therewith.

The sensor rod 98 which is mounted on the knife operating rod 97 by the releasable lock screw 101 is provided on its lower end (FIG. 14) with a foot 111 that is in position to be engaged by the forward end 112 of the forward moving extruded block of meat 57. When this occurs, the foot 111 and the sensor rod 98 is pushed to one side as indicated by the arrow 113 of FIG. 2. This rotates the rod 97 in a clockwise direction as viewed in FIG. 2 and from the right side of FIG. 14 to rotate the cam 102 in a similar direction against the urging of return spring 114.

This causes the raised periphery 106 of the cam 102 to engage the feeler 104 and close the switch to the solenoid 107 thereby operating the one-revolution clutch 108, thereby causing the crank arm 93 to rotate 360° from the raised position of FIG. 4 and driving the knife 61 from its raised position of FIG. 3 to its lowered position of FIG. 10 and back again. This severs the block of meat 57 to form a loaf 58 and positions the knife in its raised position of FIG. 3 in preparation for the next downward severing stroke. The extruding of the block 57 of meat continues as the foot 111 is sloped as shown in FIG. 14 thereby permitting the progressing forward end 112 of the block 57 to hold the sensor rod 98 to one side while the progressing block 57 moves into position for severing the next loaf 58. Because the conveyor is moving faster than the extruded meat, the successive loaves 98 are separated from each other.

OPERATION

With the parts assembled as illustrated in the drawings, which includes closing the quick disconnect clamp 21 and the two toggle latches 77 and the apparatus energized by moving the switch 115 to the on position, the meat from the hopper 15 flows as indicated at 56 from the grinder (not shown) into and through the shaping die 22 where it is shaped by the tapered forward section 23 into a forward moving block 57 of meat having a rectangular cross-section as indicated by the shape of the die in FIG. 4.

In passing through the bottom part 43 of the die 22, the adhesive nature of the meat causes the continuous strip or sheet 37 of meat-impervious paper or other separating material to be drawn from the roll 36 through the slot 42. The provision of the spaced grooves 26 on the bottom 43 of the die 22 prevents the paper sticking to the bottom 43 of the die as it reduces the surface area of the die that is contacted by the paper. The top 116 of the die is provided with similar spaced grooves but these are provided to give a pleasing appearance to the top surface of the meat.

While the meat is being extruded, the block of meat passes through the opening 62 in the vertical knife blade 61 onto the driven conveyor 27 which is driven by the operating belt 48 that itself is driven from the pulley 51 by way of pulleys 53 and 54. The small pulley 51 is driven from the main drive or timing belt 14 and engages the large pulley 52.

The advancing block of meat 57 contacts the foot 111 at the forward end 112 of the meat which rotates the sensor rod 98 to one side as indicated by the arrow 113 in FIGS. 2 and 14. The arcuate turning of the knife operating rod 97 closes the switch 103 by raising the spring-urged feeler 104 to the raised position in engagement with the raised periphery portion 106 of the cam 102. This energizes the solenoid 107 and operates the single-revolution clutch 108 to lower the knife 61 from the raised position of FIG. 3 to the lowered meat severing position of FIG. 10 to cut the block of meat 57 and the underlying separator paper sheet 37 to form individual rectangular loaves 58 of meat, each separated from the next because of the above described differential faster speed of the conveyor as compared to the speed of extrusion of the meat.

The completion of movement of the single-revolution clutch immediately raises the knife from its lowered position of FIG. 10 back to the elevated position of FIG. 3 where the mechanism is ready for forming a succeeding loaf. In the meantime, the thusly formed loaf 58 with its adhered paper separator is ejected from the end 118 of the conveyor 31 onto a slide (not shown) or other removal device to a place of storage. When this occurs, the foot 111 immediately springs back to its original position as shown in solid lines in FIG. 2 in preparation for determining the length of the next loaf 58 of meat.

A safety switch 121 is provided on a mounting plate 122 on the interior of the housing 11 and on which the motor 12 and other operating parts are mounted. This switch 121 is held in closed position when the parts are assembled together so that it is necessary for all the parts to be mounted and clamped together before the switch 121 will close and permit operation of the apparatus.

In the embodiment illustrated, the extruding means comprises the grinder 16 which both grinds the meat in the customary manner as noted in the above-listed patent, but also applies considerable pressure to force the meat as indicated at 56 through the shaping die 22 and onto the conveyor 27 which comprises the conveying means.

The severing means adjacent to the die 22 for severing the block into a series of separate loaves comprises the vertically reciprocable knife structure 61 and the operating means therefor including the crank 93 and clutch 108.

The activating means at a preselected distance from said die which is activated by the advancing block for energizing the severing means comprises the sensor rod 98 with the foot 111 on the bottom that is contacted by the advancing block of meat 57 as illustrated in FIGS. 10 and 14 to turn the knife operating rod 97 about its longitudinal axis (as indicated by the arrow 113) to energize the single-revolution clutch 108 and move the knife rapidly from its elevated position of FIG. 3 to the extended position of FIG. 10 and back again.

The clamping means which permits the rapid changing of dies 22 when a different shaped block of meat is to be provided includes the encircling band of angular cross-section 123 and the rapid connect and disconnect buckle 124.

I claim:

1. An apparatus for forming a moldable food product of the nature of ground raw meat into a series of loaves of predetermined shape and weight, comprising:

extruding means for pressure extruding said product horizontally through a die of selected transversely cross-sectional shape to provide a rectangularly shaped moving block of said product that has the longest dimension of the rectangle horizontal, a flat bottom surface and a grooved corrugated top surface, said die defining a tapered forward section opening at its narrow end to a forming section having an inlet portion defining a corrugated top wall and a planar bottom wall, and an outlet portion having a grooved bottom wall and a top wall spaced from said grooved bottom wall a distance greater than the spacing of the corrugated top wall from the planar bottom wall of the inlet portion, permitting the corrugated top surface of the block to expand freely toward said outlet portion top wall;

conveying means adjacent to said die for conveying said block away from said die during said extruding including a generally horizontal driven conveyor for supporting the block and driven at a speed greater than the speed of the moving block;

severing means adjacent to said die for severing said block into a series of separate loaves with said conveyor causing a severed loaf to move away from said block; and activating means intermediate the ends of said driven conveyor and at a preselected distance from said die activated by the advancing said block for energizing said severing means to provide loaves of a preselected length including a sensor member which moves into the path of said block and into a space between the block and a severed loaf after the severed loaf on the conveyor has travelled past the sensor member.

2. The apparatus of claim 1 wherein said die has an inlet that is generally circular, an outlet that is horizontally rectangular and a tapered section connecting said inlet and said outlet and said die at said inlet is connected to the grinder by quick disconnect and connect clamping means to permit rapid changing of dies when a said block of different cross-sectional dimensions is required.

3. The apparatus of claim 1 including a sheet of separating material between the conveyor and said block and said separating sheet comprises a roll of said separating material adjacent to the die and conveyor, said die adjacent to said conveyor being provided with a slot through which said sheet is fed from said roll onto said conveyor, the extrusion of the block of material and the adhesive nature of said material serving to draw the sheet from said roll as the block advances.

4. The apparatus of claim 3 wherein said grooved bottom wall of the die outlet portion is contacted by said advancing sheet for reducing adhesive drag on said advancing sheet underlying the block.

5. The apparatus of claim 1 wherein said grooved bottom wall of the die outlet portion is contacted by said advancing block with spaced ridges for reducing adhesive drag on said advancing block.

6. The apparatus of claim 1 including a slot in said die forming section at a distance from said tapered forward section through which a sheet of separating material may enter into said forming section, said outlet portion of the forming section having a cross-section at the location of said slot greater than the cross section of said inlet portion of the forming section whereby the pressure within the food product is reduced at said slot to prevent food product extruding into said slot.

7. The apparatus of claim 1 wherein said severing means includes a reciprocable knife, a motor driven crank having a roller and a drive slot in said knife extending transverse to the path of knife travel for receiving said roller whereby said knife may be easily disassembled for cleaning.

8. The method of forming a moldable food product of the nature of ground raw meat into a series of loaves of predetermined shape and weight, comprising:

pressure extruding said food product through a die of selected cross-sectional shape to provide a moving elongated block of said product, said die defining a tapered formed section opening at its narrow end to a forming section having an inlet portion defining a corrugated top wall and a planar bottom wall, and an outlet portion having a grooved bottom wall and a top wall spaced from said grooved bottom wall a distance greater than the spacing of the corrugated top wall from the planar bottom wall of the inlet portion, permitting the corrugated top surface of the block to expand freely toward said outlet portion top wall;

conveying said block away from said die during said extruding on a generally horizontal conveyor moving at a speed faster than said block to provide sliding contact therebetween;

severing said block into a series of separate loaves;

moving each separate loaf on said conveyor at a linear speed faster than the linear speed of said moving block to provide a spacing between a separate loaf and said block; and sensing the leading edge of said block in said spacing between said block and said separate loaf for initiating said severing operation.

* * * * *